United States Patent
Bohn et al.

(10) Patent No.: US 8,451,226 B2
(45) Date of Patent: May 28, 2013

(54) USER INPUT DEVICE WITH OPTICAL TRACKING ENGINE THAT OPERATES THROUGH TRANSPARENT SUBSTRATE

(75) Inventors: David D Bohn, Fort Collins, CO (US); Glen C Larsen, Issaquah, WA (US)

(73) Assignee: Microsoft Corporation, Redmond, WA (US)

( * ) Notice: Subject to any disclaimer, the term of this patent is extended or adjusted under 35 U.S.C. 154(b) by 791 days.

(21) Appl. No.: 11/955,412

(22) Filed: Dec. 13, 2007

(65) Prior Publication Data

US 2009/0153485 A1    Jun. 18, 2009

(51) Int. Cl.
G06F 3/033 (2006.01)
G09G 5/08 (2006.01)
G06F 3/03 (2006.01)

(52) U.S. Cl.
CPC .................................... *G06F 3/0317* (2013.01)
USPC ............................. 345/166; 345/156; 345/163

(58) Field of Classification Search
USPC .................................................. 345/163–166
See application file for complete search history.

(56) References Cited

U.S. PATENT DOCUMENTS

| | | | |
|---|---|---|---|
| 5,805,144 A | 9/1998 | Scholder et al. | |
| 6,762,751 B2 * | 7/2004 | Kuan | 345/166 |
| 6,970,159 B2 | 11/2005 | Gray | |
| 7,170,488 B2 | 1/2007 | Kehlstadt et al. | |
| 7,212,189 B2 | 5/2007 | Shaw et al | |
| 7,439,954 B2 * | 10/2008 | Theytaz et al. | 345/166 |
| 7,773,068 B2 * | 8/2010 | Nakamura et al. | 345/104 |
| 2003/0132914 A1 | 7/2003 | Lee | |
| 2003/0142075 A1 * | 7/2003 | Chin | 345/163 |
| 2004/0041787 A1 | 3/2004 | Graves | |
| 2004/0046741 A1 | 3/2004 | Low et al. | |
| 2004/0207543 A1 * | 10/2004 | Yen et al. | 341/31 |
| 2005/0156890 A1 | 7/2005 | Wierzoch | |
| 2006/0132431 A1 * | 6/2006 | Eliezer et al. | 345/156 |
| 2006/0267940 A1 | 11/2006 | Groom et al. | |
| 2007/0247427 A1 * | 10/2007 | Huang et al. | 345/163 |
| 2009/0153482 A1 * | 6/2009 | Weinberg et al. | 345/163 |

OTHER PUBLICATIONS

Michigan Technological University Website, <http://www.cs.mtu.edu/~shene/DigiCam/User-Guide/950/depth-of-field.html>, Access date Jun. 14, 2011, 4 pages.
Greenleaf, Allen R., Photographic Optics, The MacMillan Company, New York, 1950, pp. 25-27, 5 pages.
"NuLOOQ navigator", Logitech, 2007, pp. 1-2.
"LogiNoki: the LCD mouse mod" , retrieved on Oct. 18, 2007 at <<http://www.engadget.com/2006/07/26/loginoki-the-lcd-mouse-mod>> pp. 1-3.

* cited by examiner

*Primary Examiner* — Seokyun Moon
(74) *Attorney, Agent, or Firm* — Alleman Hall McCoy Russell & Tuttle LLP

(57) ABSTRACT

A user input device for use with a computing device is provided. The user input device may include a housing with a bottom portion including a substrate that includes a transparent portion. The user input device may further include an optical tracking engine mounted in the housing proximate the substrate and being configured to transmit and/or detect light for tracking movement of the user input device through the transparent portion of the substrate.

18 Claims, 5 Drawing Sheets

USER INPUT DEVICE WITH OPTICAL TRACKING ENGINE THAT OPERATES THROUGH TRANSPARENT SUBSTRATE

BACKGROUND

Many computer mice use optical tracking engines to track movement of the mouse in an on-desktop mode of operation. Some of these computer mice have been designed with buttons on a bottom side, such that the mouse may held in a bottom-up orientation by a user during an off-desktop mode of operation, and the buttons may be actuated to command presentation software, for example. However, these buttons occupy valuable space on the bottom side of the mouse, and it can be difficult to fit both the buttons and the optical tracking engine on the bottom of the mouse, especially in mice with small form factors. Some computer mice also incorporate displays into a housing of the mouse to display information. However, fitting a large component such as a display into a mouse presents a design challenge, especially in mice with small form factors.

SUMMARY

A user input device for use with a computing device is provided. The user input device may include a housing with a bottom portion including a substrate that includes a transparent portion. The user input device may further include an optical tracking engine mounted in the housing proximate the substrate and being configured to transmit and/or detect light for tracking movement of the user input device through the transparent portion of the substrate.

This Summary is provided to introduce a selection of concepts in a simplified form that are further described below in the Detailed Description. This Summary is not intended to identify key features or essential features of the claimed subject matter, nor is it intended to be used to limit the scope of the claimed subject matter. Furthermore, the claimed subject matter is not limited to implementations that solve any or all disadvantages noted in any part of this disclosure.

DETAILED DESCRIPTION

Figure 1:
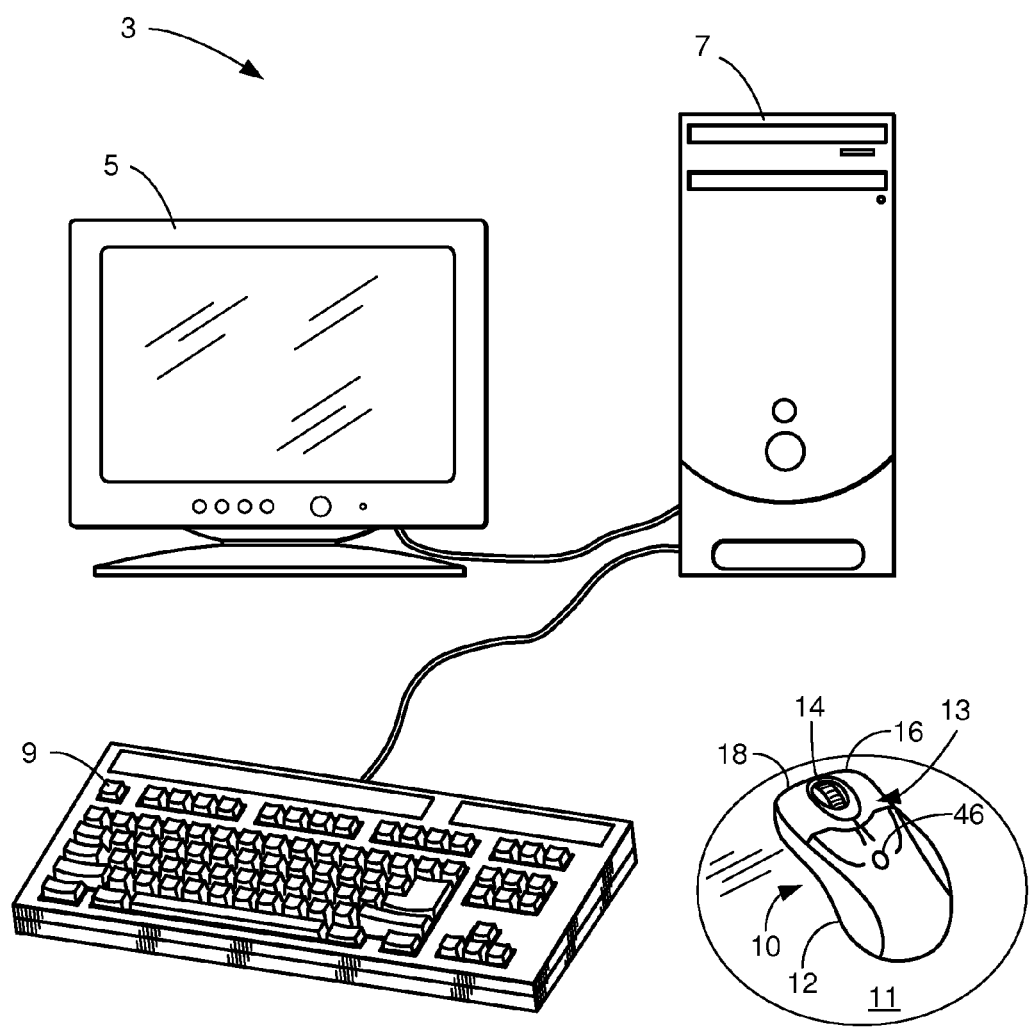
FIG. 1 is a perspective view of a user input device and an associated computing device, the user input device being shown in a top-up orientation for on-desktop use.

FIG. 1 illustrates a computing device 3 having an associated display 5, processor 7, keyboard 9, and a user input device 10. The user input device 10 is configured to communicate with the computing device 3 wirelessly or over a wire to provide user input to the computing device 3. Although computing device 3 is illustrated as a desktop personal computer, it will be appreciated that the computing device 3 may take alternative forms, such as a laptop computer, computer projector, internet-enabled television, game console, etc., as described below. In addition, although the depicted user input device 10 includes a housing 12 in the form of a computer mouse, it will be appreciated that the housing 12 may alternatively be formed in the shape of a remote control for a television or projector, a game controller, or other suitable shape.

User input device 10 is configured for both on-desktop and off-desktop use. In an on-desktop mode 60, illustrated schematically in FIG. 6, the user input device 10 may be positioned in a top-up orientation as depicted in FIG. 1. In this orientation, the user input device 10 may be manipulated by a user, for example by moving the user input device 10 on a tracking surface 11 such as a mouse pad and actuating controls such as a scroll wheel 14, a right button 16, and a left button 18 positioned on a top side 13 of user input device 10. As the user moves the user input device 10 in the on-desktop mode 60, an optical tracking engine 28, illustrated in FIG. 2, provided within the user input device is configured to emit a source light onto a tracking surface and detect changes in the pattern of source light that is reflected by the tracking surface, to thereby track movement of the user input device on the tracking surface.

Figure 3:
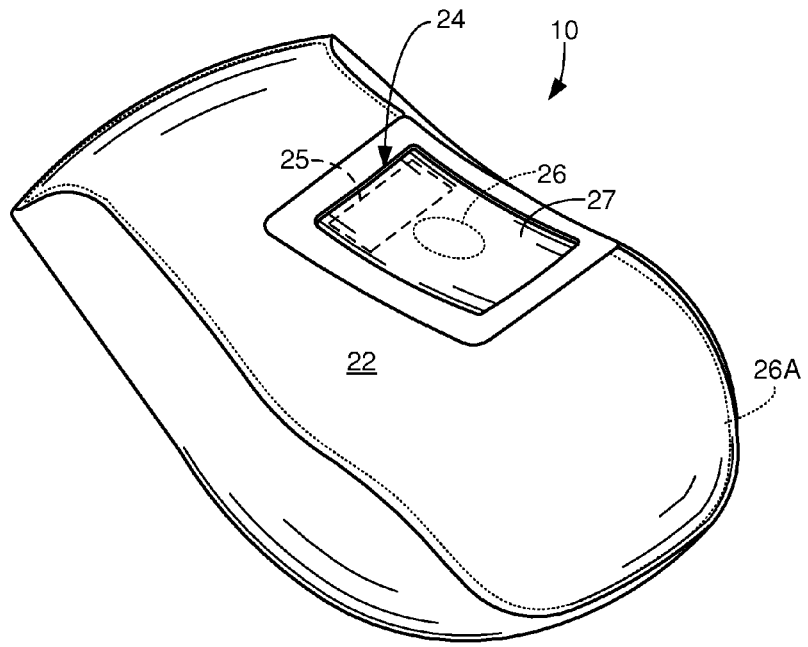
FIG. 3 is a bottom perspective view of the user input device of FIG. 1, shown in a bottom-up orientation for off-desktop use, with a substrate for touch input and/or display of content.
Figure 4:
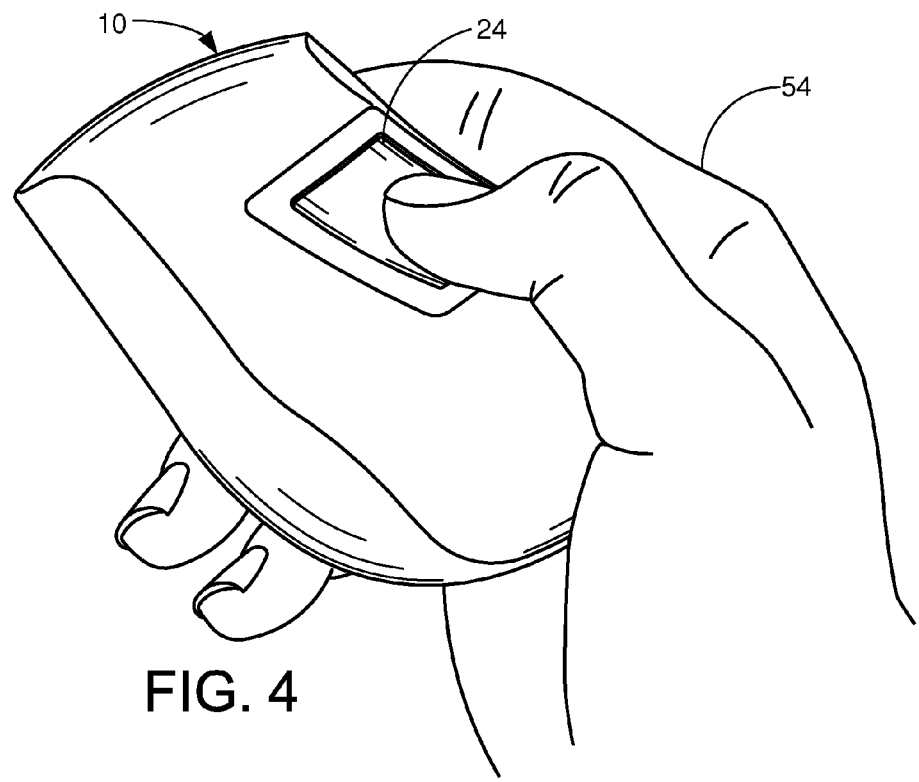
FIG. 4 is a bottom perspective view of the user input device of FIG. 1, showing a digit of a user contacting the substrate on user input device.
Figure 6:
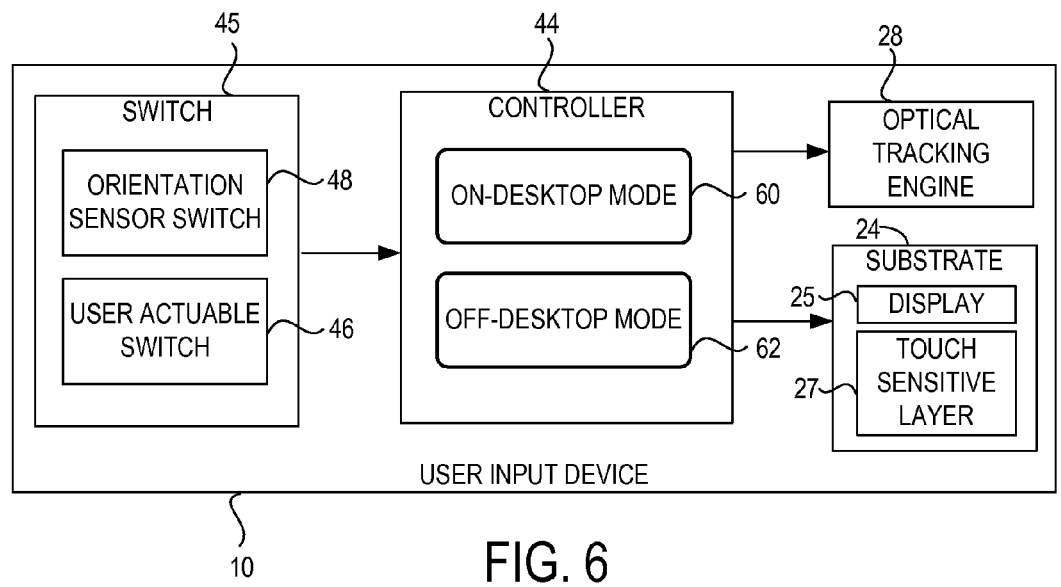
FIG. 6 is a schematic view of the user input device of FIG. 1, illustrating a controller configured to transition between an on-desktop mode and an off-desktop mode based on input from a switch.

As shown in FIGS. 3 and 4, the user input device 10 is also configured to be positioned in a bottom-up orientation and used in an off-desktop mode 62, illustrated schematically in FIG. 6. In this orientation, the user may interact with a substrate 24 positioned on the bottom of the user input device 10. The substrate 24 may include a display 25 and/or touch sensitive layer 27, and be configured as a touch sensitive input device, as a display device, or as a combined touch sensitive input and display device, as discussed in detail below in relation to FIGS. 9-13.

Figure 2:
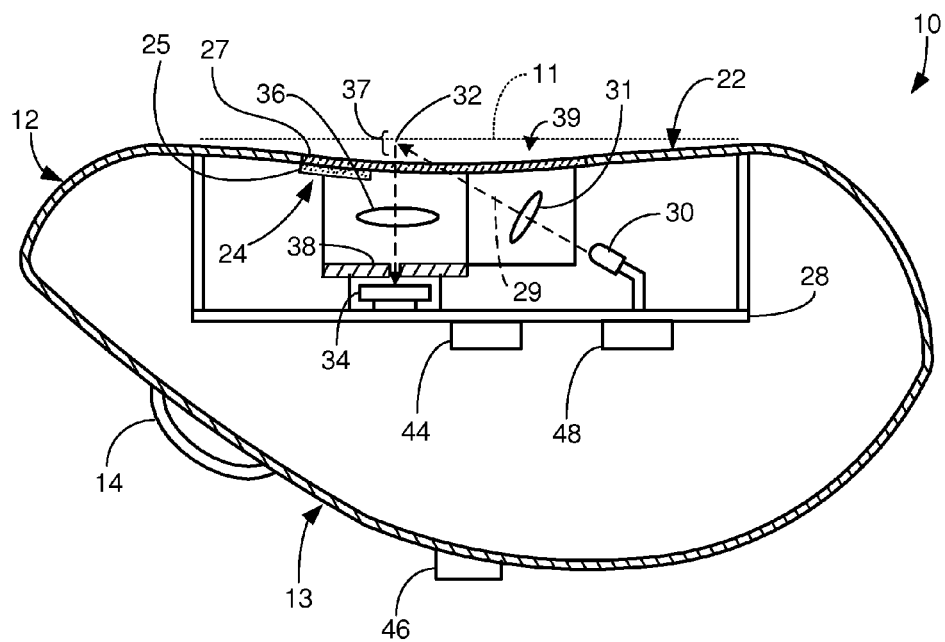
FIG. 2 is a cutaway side view of the user input device of FIG. 1.
Figure 9:
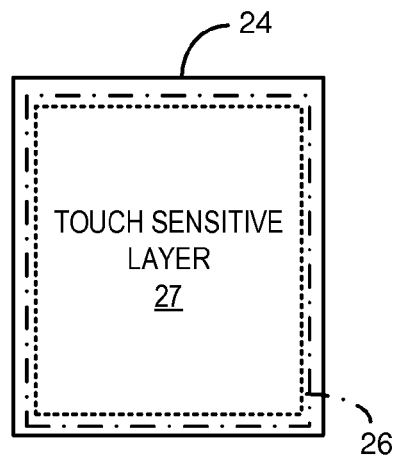
FIGS. 9-13 illustrate various configurations of the substrate of the user input device of FIG. 1.

As shown in FIG. 2, the housing 12 of the user input device 10 includes a bottom portion 22 in which substrate 24 is positioned. User input device 10 further includes an optical tracking engine 28 mounted in the housing 12 proximate to the substrate 24. The substrate 24 includes a transparent portion 26 through which an optical tracking engine 28 may interact with the tracking surface. The transparent portion 26 may occupy an internal region within the substrate 24, as illustrated in FIG. 3, or alternatively may extend to cover substantially the entire surface of the substrate 24, as illustrated in FIG. 9. Thus, it will be appreciated that the touch sensitive layer 27 may be transparent across its entire active area and the optics of the optical tracking engine 28 may operate through any suitable portion of the touch sensitive layer. In the alternative, the touch sensitive layer 27 may be transparent only in an internal region through which the optical tracking engine 28 operates. In addition or in the alternative to the touch sensitive layer, the substrate 24 may include a display 25 that is positioned such that a diffuser of the display does not overlap with the transparent portion 26 of the substrate 24 in a manner that could interfere with the optics of the optical tracking engine 28, as further explained below with reference to FIGS. 10-13.

Continuing with FIG. 2, the optical tracking engine 28 is configured to transmit and/or detect light for tracking movement of the user input device 10 through the transparent portion 26 of the substrate 24. To accomplish this, the substrate 24 and the optical tracking engine 28 are typically positioned proximate each other, such that they vertically overlap each other when the optical tracking engine 28 faces in a downward or upward orientation, in the bottom-up or top-up orientations, respectively.

The optical tracking engine 28 may include a light source 30 configured to transmit light through the transparent portion 26 of the substrate 24. Light source 30 may be a light emitting diode (LED) or other suitable light source. Light source 30 may emit light of any suitable wavelength, including both visible and non-visible light. For example, the light source may emit 880 nanometer infrared light or 470 nanometer visible light. It will be appreciated that emission of light of other wavelengths is also possible.

The transparent portion 26 of the substrate 24 is positioned in a light path 29 of light emitted from light source 30, such that emitted light passes through the transparent portion as it exits housing 12 and/or as it reenters housing 12 after being reflected by tracking surface 11. The transparent portion 26 is transparent to the wavelength of light emitted from light source 30. In some embodiments, light source 30 may be configured to emit visible light and the transparent portion 26 may be transparent to the emitted visible light. Alternatively, light source 30 may be configured to emit non-visible light and the transparent portion 26 may be transparent to the emitted non-visible light, but opaque to visible light. Thus, the transparent portion may be see-thru to a human eye in some embodiments and not see-thru in other embodiments. In one embodiment, the entire substrate 24 including the transparent portion 26, may be black, mirrored, or other color, for example, and opaque to the human eye. In such an embodiment, the substrate 24 and the transparent portion 26 may be formed to extend across an entire bottom portion 22 of the housing 12, or across the entire depression 39, such that the entire bottom portion 22 or depression 39 of the housing is transparent to non-visible light emitted by the optical tracking engine, but opaque to visible light. Thus, the entire bottom portion 22 or depression 39 may be colored in a color such as black, or in a mirror coating. It will be appreciated that the transparent portion of the substrate may encompass a region as illustrated at 26A in FIG. 3, and may not include a touch sensitive layer or display. Regarding materials, it will be appreciated that the transparent portion 26 may be formed of a transparent material such as polycarbonate, or other suitable material that is transparent in the manner described above.

Optical tracking engine 28 may also include a projecting lens 31, a focusing lens 36, and an associated optical sensor 34. Projecting lens 31 is configured to project the light emitted by light source 30 toward the tracking surface 11. In some embodiments, the projecting lens may be configured to project the light in parallel rays toward the tracking surface 11.

Focusing lens 36 is configured to focus light reflected from the tracking surface onto the optical sensor 34. Focusing lens 36 is configured such that it has a depth of field 37 on an inbound side that encompasses a reflection point 32 of the light path on the tracking surface 11. The focusing lens 36 is configured such that the depth of field 37 does not extend to encompass the surface 24. That is, the substrate 24 is located outside the depth of field 37 of the operating range of the optical tracking engine 28. In the depicted embodiment, the surface 24 is positioned closer to the focusing lens 36 than an innermost reach of the depth of field 37. The surface 24 may be positioned in a concave depression 39 formed in the bottom portion 22 of housing 12 of the user input device 10, the depression 39 being sized to position the surface 24 outside of the depth of field 37. It will also be appreciated that in some embodiments surface 24 may be flat, rather than curved.

The optical sensor 34 is configured to detect light passing into the housing 12 through the transparent portion 26 of the substrate 24 and focusing lens 36. Optical sensor 34 may include an associated aperture stop 38. A controller 44 associated with the optical sensor 34 is configured to analyze light received by the optical sensor 34 and determine the movement of the user input device 10, and to output a signal indicating the determined movement to computing device 3. In one example optical sensor 34 may capture successive images of the reflected light, and the differences between these images may be analyzed to determine movement of the user input device 10.

It will be appreciated that the transparent nature of transparent portion 26 enables the light to pass through without optical interference that would negatively affect the optical tracking functionality of the optical tracking engine 28. Passage of light through non-transparent elements, such as diffusers used on LCDs, may negatively interfere with optical tracking, and therefore a diffuser is not generally included in transparent portion 26, nor in any other location along light path 29. Further, it will be appreciated that the placement of the substrate 24 outside of the depth of field 37 inhibits optical interference that may be caused by imperfections in the substrate, such as scratches that may accumulate during use over time, from interfering with the tracking functionality of the optical tracking engine 28, by rendering any such imperfections out of focus in the image received the optical sensor 34.

Figure 5:
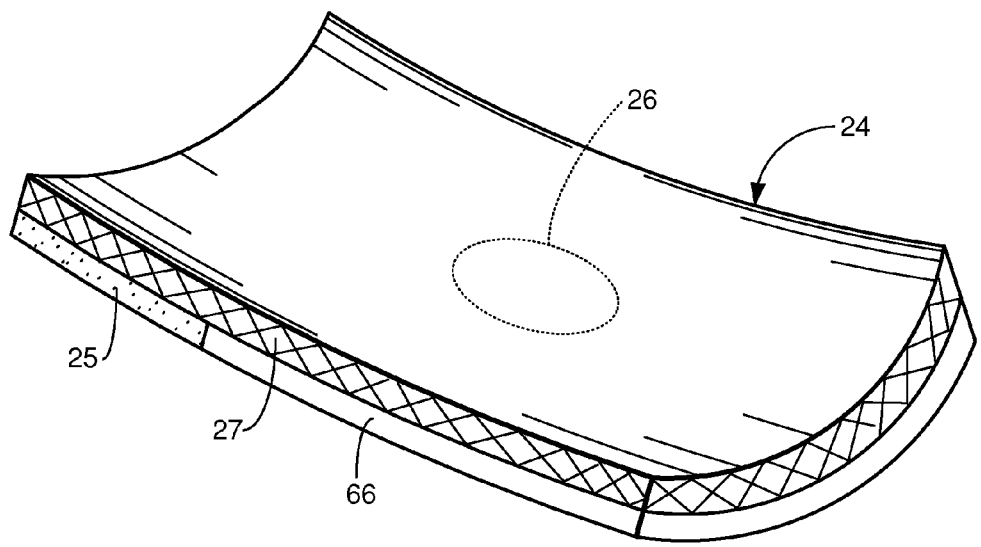
FIG. 5 is a bottom perspective view of an alternative embodiment of the substrate of FIG. 3, which curves in two dimensions.

As shown in FIG. 2, the substrate 24 may be curved in one dimension, such as curved concavely about a lateral axis in the user input device. This may facilitate use of flexible planar components in the manufacture of substrate 24. Alternatively, as shown in FIG. 5, the substrate 24 may be curved in two dimensions. The two dimensional curvature may be designed ergonomically, allowing the user to easily operate the device, inhibiting discomfort. Alternatively, in some embodiments, the substrate 24 may be flat.

Continuing with FIG. 2, the controller 44 of user input device 10 may be configured to receive user input from the optical tracking engine 28, substrate 24, and controls on the top side 13 of the user input device. The controller 44 may further be configured send a signal to computing device 3 indicating this user input, via a wired or wireless connection. In embodiments in which substrate 24 is configured as a display device, controller 44 may also be configured to receive display data from computing device 3 for display on the display 25 of the substrate 24.

As shown in FIG. 6, controller 44 is configured to switch between an on-desktop mode 60 and off-desktop mode 62. The user input device 10 may include switch 45 configured to cause the controller to transition between the on-desktop mode 60 and the off-desktop mode 62. The switch 45 may include a user-actuatable switch 46, such as a may be a membrane switch or other suitable switch. As shown in FIG. 1, the user-actuatable switch 46 may be positioned on a top side 13 of the user input device 10, or at another suitable location on the user input device 10.

In addition or in the alternative to user-actuatable switch 46, the switch 45 may be orientation sensor switch 48 configured to detect whether optical tracking engine 28 is facing upwards or downwards, and to cause the controller 44 to switch modes according to the sensed orientation. A mercury switch or other suitable device may be used as orientation sensor switch 48. It will be appreciated that FIG. 1 shows an on-desktop orientation in which the optical tracking engine is facing downwards and the on-desktop mode 60 would be activated by the orientation sensor switch, and FIGS. 2-3 show an off-desktop orientation in which the optical tracking engine is facing upwards and the off-desktop mode 62 would be activated by the orientation sensor switch.

In the on-desktop mode 60, the optical tracking engine 28 is activated and light source 30 emits light for position tracking. Further, the scroll wheel 14, right button 16, and left button 18 are configured to accept input, while the display 25 and touch sensitive layer 27 of substrate 24 are turned off. Thus, in the on-desktop mode 60, the user may use the user input device in an energy efficient manner, and without accidentally inputting touch input via touch sensitive layer 27. In the off-desktop mode, the scroll wheel 14, right side button 16, and left side button 18 are turned off, and the display 25 and touch sensitive layer 27 of substrate 24 are turned on, such that the display begins to display content sent from computing device 3, and the touch sensitive layer 27 begins to sense touch input. Thus, in off-desktop mode 62, the user may use user input device 10 for input while standing during a presentation, relaxing on a sofa, etc., and not accidentally enter erroneous input via the scroll wheel 14, right button 16, or left button 18. Examples of content that may be displayed on the display 25 include notes from a presentation, television channel guide information, etc. Examples of touch input that may be received via touch sensitive layer 27 include, slide forward and backward commands, channel numbers, pointer movements, etc.

Figure 7:
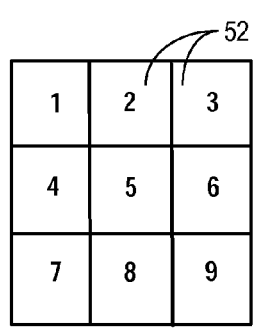
FIG. 7 is a schematic view of a substrate of the user input device of FIG. 1, configured as a number pad.
Figure 8:
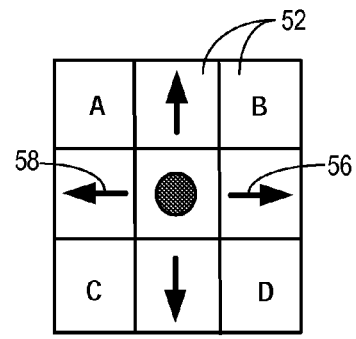
FIG. 8 is a schematic view of a substrate of the user input device of FIG. 1, configured with directional arrows and soft keys.

As shown in FIGS. 7 and 8, to accomplish the above-described functions, in some embodiments the touch sensitive layer 27 of substrate 24 may be divided into a plurality of regions 52, and an input function may be assigned to each region. FIG. 7 illustrates a touch sensitive layer divided into numeric regions to form a numeric keypad, and FIG. 8 illustrates directional arrow buttons, a central select button, and soft keys numbered A-D. Countless other variations are possible for the layout, indicia, and function associated with each region. It will be appreciated that indicia indicating the function of the regions 52 may be printed upon the substrate 24, or may be displayed by a display 25 of the substrate. Upon selection of a region 52 by a digit 54 of a user contacting touch sensitive layer 27, a signal may be transmitted to computing device 3 corresponding to the function of the selected region.

In one example, the user input device 10 may be used to control a presentation program executed on computing device 3 configured to display a number of slides, and a right arrow 56 and a left arrow 58 may allow the user to scroll backward and forward through the slides. In alternate embodiments, the substrate 24 may be configured to interact with a variety of different programs executed on computing device 3. Each program may instruct the user input device to display a corresponding set of regions 52 on the display 25 of substrate 24, with a program-specific layout, indicia, and function for each region 52.

Figure 10:
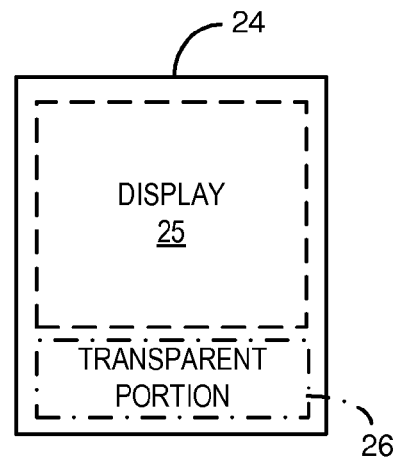

FIGS. 9-13 illustrate various configurations of the substrate 24. As illustrated in FIG. 9, when configured as a touch sensitive input device, the substrate 24 may include a touch sensitive layer 27 based on capacitive, resistive, or optical sensing material, which is configured to detect when an object, such as a digit 54 of the user, as illustrated in FIG. 4, or a stylus, contacts the touch sensitive layer 27. In FIG. 9, a transparent portion 26 encompasses the touch sensitive layer 27. In such a configuration, a touch sensitive layer 27 may be utilized that is transparent across substantially an entire active surface of the layer, and the optical tracking engine 28 may operate through any suitable portion of the touch sensitive layer 27. Alternatively, as shown in FIG. 10, when configured as a display device, the substrate 24 may include a display 25 such as a liquid crystal display (LCD), as well as a transparent portion 26. In FIG. 10, the display 25 and transparent portion do not overlap, to avoid interference with a diffuser layer of the display 25 and the light emitted and/or detected by the optical tracking engine 28 through transparent portion 26.

Figure 11:
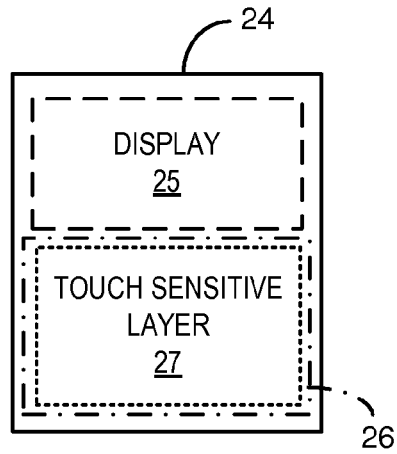
Figure 12:
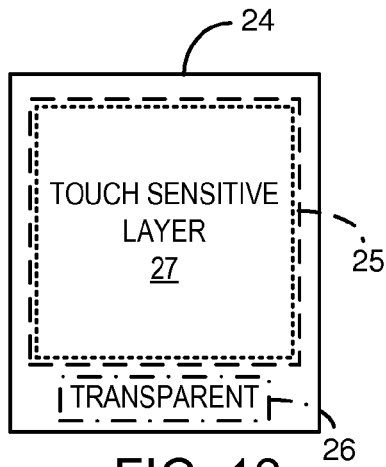
Figure 13:
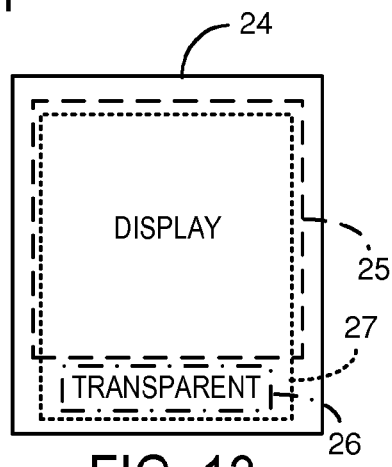

As yet another alternative illustrated in FIGS. 11-13, when configured as a combined touch sensitive input device and display device, the substrate 24 may include, for example, both a display 25 and a touch sensitive layer 27 positioned proximate to the display 25, as well as a transparent portion 26 through which the optical tracking engine 28 is configured to transmit and/or detect light. FIG. 11 illustrates a touch sensitive layer 27 and transparent portion 26 that are substantially coextensive, and a display 25 that does not overlap with either the touch sensitive layer 27 or the transparent portion 26. FIG. 12 illustrates a touch sensitive layer 27 and display 25 that are substantially coextensive and a transparent portion that is set apart. FIG. 13 illustrates a touch sensitive layer 27 overlapping both a display 25 and a transparent portion 26.

Figure 14:
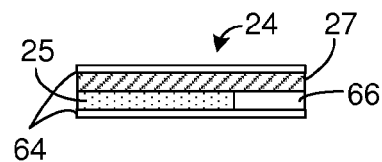
FIG. 14 is a schematic cross-sectional view of the substrate of the user input device of FIG. 1, illustrating a touch sensitive layer and a display layer in the substrate.

FIG. 14 is a schematic cross-sectional view of the substrate 24, illustrating the touch sensitive layer 27 and display 25 in the substrate 24. One or more encapsulation layers 64 may be provided for protection and/or support purposes, on either or both of the top and bottom of the substrate 24. The layer in which display 25 is contained may also include transparent filler portion 66, in areas to which the display 25 does not extend. Such a filler portion 66 is also illustrated in FIG. 5. It will be appreciated that the thickness of the layers of substrate 24 is exaggerated for the purposes of clarity in FIG. 14, and that thin films may be used for the layers, resulting in a thin substrate 24 with a substantially smooth top and bottom surface.

The above described user input device embodiments are designed for easy use both on-desktop and off-desktop, and offer the convenience of a substrate configured as a display device and/or touch sensitive input device, while achieving an economy of space made possible by configuring the optical engine to transmit and/or detect light through the substrate.

It will be appreciated that the computing device described herein may be any suitable computing device configured to interact with the user input device embodiments described herein. For example, the computing device may be a personal computer, projector, computer game console, computer kiosk, laptop computer, portable data assistant (PDA), computer-enabled wireless telephone, networked computing device, or other suitable computing device, and may be connected to computer networks, such as the Internet. The computing device typically includes a processor and associated volatile and non-volatile memory, and is configured to execute programs stored in memory using portions of volatile memory and the processor.

It should be understood that the embodiments herein are illustrative and not restrictive, since the scope of the invention is defined by the appended claims rather than by the description preceding them, and all changes that fall within metes and bounds of the claims, or equivalence of such metes and bounds thereof are therefore intended to be embraced by the claims.

The invention claimed is:

1. A user input device for use with a computing device, the user input device comprising:
   a housing with a bottom portion including a substrate that includes a transparent portion; and
   an optical tracking engine mounted in the housing proximate the substrate and being configured to transmit and detect light for tracking movement of the user input device through the transparent portion of the substrate;
   wherein the transparent portion of the substrate through which light is transmitted and detected by the optical tracking engine is positioned in a concave depression formed in the bottom portion of the user input device, the concave depression sized to position the transparent portion of the substrate outside of a depth of field of the optical tracking engine such that the transparent portion is closer to a focusing lens of the optical tracking engine than an innermost reach of the depth of field of the optical tracking engine; and
   wherein the substrate is configured as a touch sensitive input device, and includes a touch sensitive layer formed of capacitive or resistive sensing material.

2. The user input device of claim 1, wherein the optical tracking engine includes a light source configured to transmit light through the transparent portion of the substrate.

3. The user input device of claim 2, wherein the optical tracking engine includes an optical sensor configured to detect light passing into the housing through the transparent portion of the substrate.

4. The user input device of claim 2, wherein the transparent portion of the substrate is transparent to the light emitted from the light source.

5. The user input device of claim 4, wherein the light source is configured to emit visible light and the transparent portion is transparent to visible light.

6. The user input device of claim 4, wherein the light source is configured to emit non-visible light and the transparent portion is transparent to non-visible light, but opaque to visible light.

7. The user input device of claim 6, wherein the substrate and transparent portion are formed to extend across the entire bottom portion of the housing, such that the entire bottom portion of the housing is transparent to non-visible light emitted by the optical tracking engine, but opaque to visible light.

8. The user input device of claim 1, wherein the substrate further includes a display.

9. The user input device of claim 8, wherein the display includes a diffuser, the diffuser not overlapping with the transparent portion of the substrate.

10. The user input device of claim 1, wherein the substrate is curved in one dimension or two dimensions.

11. The user input device of claim 1, further comprising a controller configured to switch between an on-desktop mode of operation and an off-desktop mode of operation in which a touch sensitive layer for sensing touch inputs is turned on.

12. The user input device of claim 11, further comprising a user-actuatable switch configured to cause the controller to transition between the on-desktop mode and off-desktop mode.

13. The user input device of claim 11, further comprising an orientation sensor switch configured to detect whether the optical tracking engine is facing upwards or downwards, and in response cause the controller to transition between the on-desktop mode and off-desktop mode.

14. The user input device of claim 1, wherein the substrate is divided into a plurality of regions, an input function being assigned to each region.

15. The user input device of claim 1, wherein the housing is formed in the shape of a mouse, remote control, or game controller.

16. The user input device of claim 1, wherein the substrate and the optical tracking engine vertically overlap each other when the optical engine faces in an upward or downward orientation.

17. A user input device for use with a computing device, the user input device comprising:
    a housing with a bottom portion including a substrate that includes a transparent portion positioned in a concave depression formed in the bottom portion of the user input device, the concave depression sized to position the transparent portion of the substrate outside of a depth of field of an optical tracking engine such that the transparent portion is closer to a focusing lens of the optical tracking engine than an innermost reach of the depth of field of the optical tracking engine, and the substrate being configured as a touch sensitive input device and including a touch sensitive layer formed of capacitive or resistive sensing material; and
    wherein the optical tracking engine is mounted in the housing proximate the substrate and is configured to transmit and detect light for tracking movement of the user input device through the transparent portion of the substrate;
    wherein the optical tracking engine includes a light source configured to transmit light through the transparent portion of the substrate, and an optical sensor configured to detect light passing into the housing through the transparent portion of the substrate; and
    wherein the transparent portion of the substrate is transparent to the light emitted from the light source.

18. A user input device for use with a computing device, the user input device comprising:
    a housing with a bottom portion including a substrate that includes a transparent portion, the substrate including a touch sensitive layer and a display, wherein the transparent portion does not overlap with the display and is positioned in a concave depression formed in the bottom portion of the user input device, the concave depression sized to position the transparent portion of the substrate outside of a depth of field of an optical tracking engine such that the transparent portion is closer to a focusing lens of the optical tracking engine than an innermost reach of the depth of field of the optical tracking engine;
    wherein the optical tracking engine is mounted in the housing proximate the substrate and is configured to transmit and detect light for tracking movement of the user input device through the transparent portion of the substrate;
    wherein the optical tracking engine includes a light source configured to transmit light through the transparent portion of the substrate, and an optical sensor configured to detect light passing into the housing through the transparent portion of the substrate;
    wherein the transparent portion of the substrate is transparent to the light emitted from the light source; and
    wherein the touch sensitive layer is formed of capacitive or resistive sensing material.

* * * * *